United States Patent
Hall et al.

(10) Patent No.: US 9,080,064 B2
(45) Date of Patent: Jul. 14, 2015

(54) METHOD OF APPLYING A COATING COMPOSITION OF QUATERNARY AMMONIUM SALTS CONTAINING NON-HALOGEN ANIONS AS ANTICORROSIVE AGENTS

(71) Applicant: LONZA INC., Allendale, NJ (US)

(72) Inventors: Larry K. Hall, Easton, PA (US); Joseph William Scheblein, Hunterdon, NJ (US); Michael Yao-chi Chiang, Whitehouse Station, NJ (US); Joseph Kimler, Yardville, NJ (US)

(73) Assignee: LONZA INC., Allendale, NJ (US)

( * ) Notice: Subject to any disclaimer, the term of this patent is extended or adjusted under 35 U.S.C. 154(b) by 0 days.

(21) Appl. No.: 14/021,511

(22) Filed: Sep. 9, 2013

(65) Prior Publication Data
US 2014/0050926 A1 Feb. 20, 2014

Related U.S. Application Data (63) Continuation of application No. 11/299,301, filed on Dec. 9, 2005, now abandoned, which is a continuation-in-part of application No. 10/857,636, filed on May 28, 2004, now abandoned, which is a continuation-in-part of application No. 10/810,279, filed on Mar. 26, 2004, now abandoned.

(60) Provisional application No. 60/634,794, filed on Dec. 9, 2004, provisional application No. 60/474,081, filed on May 28, 2003.

(51) Int. Cl.
| | |
|---|---|
| C23F 11/10 | (2006.01) |
| C10G 75/02 | (2006.01) |
| C11D 1/62 | (2006.01) |
| C09D 5/08 | (2006.01) |
| C11D 3/00 | (2006.01) |
| C23F 11/14 | (2006.01) |
| C11D 1/75 | (2006.01) |

(52) U.S. Cl.
CPC ............ *C09D 5/08* (2013.01); *C10G 75/02* (2013.01); *C11D 1/62* (2013.01); *C11D 3/0073* (2013.01); *C23F 11/10* (2013.01); *C23F 11/141* (2013.01); *C11D 1/75* (2013.01)

(58) Field of Classification Search
CPC ............ C10G 75/02; C11D 1/62; C11D 1/75; C11D 3/0073; C23F 11/10; C23F 11/141; C09D 5/08
USPC ......................................................... 252/390
See application file for complete search history.

(56) References Cited

U.S. PATENT DOCUMENTS

| | | |
|---|---|---|
| 3,413,160 A | 11/1968 | Teumac |
| RE30,714 E | 8/1981 | Harriman et al. |
| RE30,796 E | 11/1981 | Lesinski |
| 4,637,899 A | 1/1987 | Kennedy, Jr. |

(Continued)

*Primary Examiner* — Joseph D Anthony
(74) *Attorney, Agent, or Firm* — Hoffmann & Baron, LLP (57) ABSTRACT

Disclosed are quaternary ammonium salts containing non-halogen anions (e.g., quaternary ammonium carbonates, bicarbonates, and mixtures thereof) as anti-corrosive agents. The invention relates to a method for inhibiting the corrosion of metal surfaces by applying a composition containing one or more quaternary ammonium carbonate or bicarbonate. The disclosure is also directed to anti-corrosive coatings for metal substrates containing these compounds, to metal substrates having these anticorrosive coatings, and to aqueous cleaning solutions containing these compounds.

17 Claims, 2 Drawing Sheets

DDAC  DDACB

(56) References Cited

U.S. PATENT DOCUMENTS

| | | | | |
|---|---|---|---|---|
| 4,792,417 | A | 12/1988 | Mizia et al. | |
| 5,217,946 | A | 6/1993 | Dolhert | |
| 5,294,653 | A | 3/1994 | Colucci | |
| 5,438,034 | A | 8/1995 | Walker | |
| 5,476,615 | A | 12/1995 | Hall et al. | |
| 5,547,990 | A | 8/1996 | Hall et al. | |
| 5,608,000 | A | 3/1997 | Duan et al. | |
| 5,707,729 | A * | 1/1998 | Satoh | 428/344 |
| 5,853,621 | A * | 12/1998 | Miller et al. | 252/500 |
| 5,972,862 | A | 10/1999 | Torii et al. | |
| 6,080,789 | A | 6/2000 | Lutz | |
| 6,172,149 | B1 | 1/2001 | Shah et al. | |
| 6,197,419 | B1 * | 3/2001 | Hyde et al. | 428/354 |
| 6,197,861 | B1 * | 3/2001 | Laver | 524/367 |
| 6,297,285 | B1 | 10/2001 | Lutz | |
| 6,372,410 | B1 | 4/2002 | Ikemoto et al. | |
| 6,521,028 | B1 | 2/2003 | Frenier | |
| 6,527,981 | B1 | 3/2003 | Tseng et al. | |
| 8,337,640 | B2 * | 12/2012 | Bedard et al. | 148/240 |
| 8,580,154 | B2 * | 11/2013 | Bedard et al. | 252/390 |
| 2002/0165283 | A1 * | 11/2002 | Lutz | 514/642 |
| 2003/0125423 | A1 * | 7/2003 | George et al. | 523/400 |
| 2005/0003978 | A1 | 1/2005 | Hall et al. | |
| 2005/0012077 | A1 | 1/2005 | Hall et al. | |
| 2006/0151071 | A1 | 7/2006 | Bedard et al. | |
| 2009/0004287 | A1 | 1/2009 | Kimler et al. | |
| 2009/0203645 | A1 | 8/2009 | Hall et al. | |

* cited by examiner

FIG. 1

DDAC　　　　　DDACB

FIG. 2

DDAC　　　　　DDACB

METHOD OF APPLYING A COATING COMPOSITION OF QUATERNARY AMMONIUM SALTS CONTAINING NON-HALOGEN ANIONS AS ANTICORROSIVE AGENTS

CROSS REFERENCE OF PRIORITY APPLICATIONS

This application is a continuation of U.S. patent application Ser. No. 11/299,301, filed Dec. 9, 2005, which claims the benefit of U.S. Provisional Application Ser. No. 60/634,794, filed Dec. 9, 2004, and is a continuation-in-part of U.S. patent application Ser. No. 10/857,636, filed May 28, 2004, which is a continuation-in-part of U.S. patent application Ser. No. 10/810,279 filed Mar. 26, 2004, which claims the benefit of U.S. Provisional Application Ser. No. 60/474,081 filed May 28, 2003, all of which are incorporated by reference in their entirety.

FIELD OF THE INVENTION

The present invention relates to the use of quaternary ammonium salts containing non-halogen anions (e.g., quaternary ammonium carbonates and bicarbonates) as anticorrosive agents.

BACKGROUND

In processes where metal surfaces come in contact with water, whether as liquid water or humid air, there is always the danger of corrosion. This is particularly problematic when the metal itself is prone to corrosion and is not coated.

Examples of metals prone to corrosion are found in stamped metal car parts made from ferrous alloys, abraded surfaces such as machined steel parts, and machine components made from cast iron. Although corrosion inhibitors (or anticorrosive agents) have been known for many years, most are still inadequate. One key inadequacy is that of water solubility. Most corrosion inhibitors are produced from long chain fatty acids and derivatives and often have poor aqueous solubility. This is especially problematic when the metal surface contacts both water and oil, such as in oil and gas production, petroleum processing, and metal working applications. Petrochemical processing itself presents a wide array of challenges for corrosion inhibitors including cooling systems, refinery units, pipelines, steam generators, and oil or gas producing units.

In order to reduce the rate of corrosion of metals (such as metal vessels, equipment metal parts, equipment surfaces, pipelines, and equipment used to store the fluids), especially those containing iron, corrosion inhibitors are typically added to the fluid contacting the metal. The fluid may be a gas, a slurry, or a liquid.

Traditional solvents for cleaning metal and metal parts, such as mineral spirits and kerosene, have been replaced in recent years by aqueous formulations due to concerns about volatile organic carbons (VOCs). This move toward water-based formulations for cleaning metal parts is not without problems. Water does not solubilize grease or oily residues easily, and water itself can markedly increase the corrosion of the metal parts themselves. In addition, formulations are typically used as microemulsions, which require the use of additional surfactants for stabilization during the cleaning process. Morpholine is frequently used in these cleaning formulations to provide corrosion protection. However, morpholine does little to contribute to cleaning, and does not stabilize the microemulsion, since it is not a good surfactant. Furthermore, morpholine is a regulated product, since it may be used to prepare illicit drugs.

Quaternary ammonium compounds have found limited use as corrosion inhibitors. U.S. Pat. No. 6,521,028 discloses the use of particular pyridinium and quinolinium salts, in either propylene glycol or propylene glycol ether solvents, as corrosion inhibitors.

U.S. Pat. Nos. 6,080,789, and 6,297,285 disclose the use of quaternary ammonium carbonates as disinfectants.

U.S. Pat. No. 4,792,417 discloses a composition for inhibiting stress corrosion of stainless steel in contact with aqueous and/or polar organic solutions which contain chloride ions and optionally cuprous ions. The composition comprises an aqueous or polar organic solution of a particular quaternary ammonium alkylcarbonate or quaternary ammonium benzylcarbonate.

There is still a need for corrosion inhibitors that possess good affinity for metallic surfaces and are both water and oil soluble. Additionally, there is a desire for new corrosion inhibitors that add cleaning and or surfactant capability. Corrosion inhibitors that also afford antimicrobial protection to the finished formulation to which they are applied would be particularly advantageous.

DESCRIPTION OF THE INVENTION

It has now been discovered that quaternary ammonium salts containing non-halogen anions (such as quaternary ammonium carbonates and bicarbonates) inhibit the corrosion of metals.

Here and hereinbelow, non-halogen anions are any anions other than halide anions such as fluoride, chloride, bromide and iodide, anions derived from oxo acids of halogens such as chloric or perchloric acid and anions containing halogen bound to other nonmetallic or metallic atoms, such as tetrafluoroborate, hexafluorophosphate, tetrachloroferrate and the like.

The present invention relates to a method for inhibiting the corrosion of metal surfaces by applying (or depositing) a corrosion inhibiting effective amount of a composition comprising (a) at least one quaternary ammonium salt containing a non-halogen anion, and (b) optionally, a solvent. This method is particularly useful for down-hole applications in oilfields and metal working.

According to one preferred embodiment, the composition comprises (a) at least one quaternary ammonium carbonate, bicarbonate, or a mixture thereof; and (b) optionally, a solvent.

Another embodiment is an anti-corrosive coating for metal substrates. The coating includes at least one quaternary ammonium salt containing a non-halogen anion, and a coating material. Typically, the quaternary ammonium salt containing a non-halogen anion is dispersed in the coating material. According to a preferred embodiment, the coating also exhibits antimicrobial efficacy. The coating may include an antimicrobial effective amount of the anti-corrosive quaternary ammonium salt containing a non-halogen anion or of a different antimicrobial agent.

According to one preferred embodiment, the coating includes at least one quaternary ammonium carbonate, bicarbonate, or a mixture thereof, and a coating material.

Yet another embodiment is a metal substrate having the anticorrosive coating of the present invention on a surface thereof.

Yet another embodiment is the use of an aqueous solution comprising a corrosion inhibiting effective amount of at least one quaternary ammonium salt containing a non-halogen anion as an anti-corrosive cleaning solution. The aqueous cleaning solution may be an aqueous-based metal cleaner.

According to one preferred embodiment, the aqueous solution comprises a corrosion inhibiting effective amount of at least one quaternary ammonium carbonate, bicarbonate, or a mixture thereof as an anti-corrosive cleaning solution.

Yet another embodiment is the use of an aqueous or non-aqueous solution comprising a corrosion inhibiting effective amount of at least one quaternary ammonium salt containing a non-halogen anion as an anti-corrosive metalworking fluid. According to one preferred embodiment, the aqueous or non-aqueous solution comprises a corrosion inhibiting effective amount of at least one quaternary ammonium carbonate, bicarbonate, or a mixture thereof as an anti-corrosive metalworking fluid.

Yet another embodiment is the use of an aqueous or non-aqueous solution comprising a corrosion inhibiting effective amount of at least one quaternary ammonium salt containing a non-halogen anion as a corrosion inhibitor in powder metallurgy. According to one preferred embodiment, the aqueous or non-aqueous solution comprises a corrosion inhibiting effective amount of at least one quaternary ammonium carbonate, bicarbonate, or a mixture thereof as a corrosion inhibitor in powder metallurgy.

Corrosion Inhibitor Compositions

The present invention is directed towards the inhibition of corrosion of metal substrates. The term "inhibition of corrosion" as used herein includes, but is not limited to, the prevention or reduction in the rate of oxidation of a metal surface, generally when the metal is exposed to water or air, or a combination of the two. The oxidation of metal is an electrochemical reaction generally resulting either in a loss of metal from the surface or an accumulation of oxidation products at the surface of the metal. The term "metal" as used herein includes, but is not limited to, steel, cast iron, aluminum, metal alloys, and combinations thereof. In one embodiment, the metal substrate is an aerosol can.

According to the invention, the corrosion of a metal substrate is inhibited by a method comprising the step of contacting the substrate with a composition comprising (a) at least one quaternary ammonium salt containing a non-halogen anion, and (b) optionally, a solvent.

Quaternary ammonium salts useful in the present invention include, but are not limited to, those having the formula:

(I)

wherein $R^1$ is an optionally aryl-substituted $C_{1-20}$ alkyl group, and $R^2$ is an optionally aryl-substituted $C_{1-20}$ alkyl group, $R^3$ and $R^4$ independently of each other are $C_{1-4}$ alkyl groups, $X^{n-}$ is an anion selected from the group consisting of hydroxide, carbonate, bicarbonate, phosphates, phosphites, hypophosphite, nitrate, sulfates, borates, anions of saturated and unsaturated acyclic $C_{1-20}$ monocarboxylic acids, anions of saturated and unsaturated acyclic $C_{2-20}$ dicarboxylic acids, and anions of hydroxy-substituted carboxylic acids, and n denotes the appropriate number of negative charges of said anion.

According to one embodiment, the quaternary ammonium salt(s) have the formula above with the proviso that, if both $R^3$ and $R^4$ are methyl, $X^{n-}$ is neither carbonate nor bicarbonate.

Here and hereinbelow, $C_{1-20}$ alkyl groups are linear or branched alkyl groups having 1 to 20 carbon atoms, including, but not limited to, methyl, ethyl, propyl, isopropyl, butyl, isobutyl, sec-butyl, tert-butyl, pentyl, isopentyl, hexyl, heptyl, octyl, nonyl, isononyl, decyl, dodecyl, tetradecyl, hexadecyl, octadecyl and icosyl. Aryl-substituted $C_{1-20}$ alkyl groups are any of the above groups bearing an aryl group, in particular phenyl, as a substituent.

Preferred examples of aryl-substituted $C_{1-20}$ alkyl groups are benzyl, phenylethyl and phenylpropyl.

The term "phosphates" is to be understood as including both acid and neutral salts of phosphoric acid, namely, dihydrogenphosphates ($H_2PO_4^-$), monohydrogenphosphates ($HPO_4^{2-}$) and phosphates ($PO_4^{3-}$), as well as salts of oligo- and polyphosphoric acids such as diphosphates (pyrophosphates) and triphosphates.

Phosphites are salts of phosphorous acid containing the anions $H_2PO_3^-$ and/or $HPO_3^{2-}$.

Sulfates are hydrogensulfate ($HSO_4^-$) and sulfate ($SO_4^{2-}$) as well as disulfate ($S_2O_7^{2-}$) and related anions.

Borates are any anions derived from boric acid ($H_3BO_3$) and the various polyboric acids.

Saturated and unsaturated acyclic $C_{1-20}$ monocarboxylic acids are in particular alkanoic acids, such as formic, acetic, propionic, butyric, pentanoic, hecanoic, octanoic, decanoic, dodecanoic, tetradecanoic, hexadecanoic, octadecanoic and icosanoic acids, or alkenoic acids, such as acrylic, methacrylic, oleic and linolic acid.

Saturated and unsaturated acyclic $C_{2-20}$ dicarboxylic acids are in particular alkanedioic acids, such as oxalic, malonic, succinic, glutaric and adipic acid, or alkenedioic acids such as fumaric or maleic acid.

Hydroxy-substituted carboxylic acids are any carboxylic acids bearing at least one hydroxy group in addition to the carboxylate group(s), such as glycolic, malic, citric or salicylic acid.

According to one embodiment, $R^1$ and $R^2$ are $C_{4-20}$ alkyl or aryl-substituted $C_{4-20}$ alkyl groups.

According to a preferred embodiment, $R^1$ is a $C_{8-12}$ alkyl or aryl-substituted $C_{8-12}$ alkyl group.

The aforementioned quaternary ammonium salts can be prepared by methods known in the art, for example by anion-exchange reactions using commercially available quaternary ammonium salts as starting materials.

Preferably, $R^3$ and $R^4$ in the quaternary ammonium salts containing a non-halogen anion are methyl groups.

In a preferred embodiment, $R^1$ and $R^2$ in the quaternary ammonium salts (I) denote the same $C_{1-20}$ alkyl group.

In a more preferred embodiment, $R^1$ and $R^2$ in the quaternary ammonium salts (I) denote $C_{10}$ alkyl groups, most preferably n-$C_{10}$ alkyl groups.

In another preferred embodiment, $R^1$ in the quaternary ammonium salts (I) denotes a methyl group. More preferably, both $R^1$ and $R^2$ denote a methyl group.

In still another preferred embodiment, $R^1$ in the quaternary ammonium salts (I) denotes a benzyl or phenylethyl group.

The above described quaternary ammonium salts can be used alone as corrosion inhibitors or formulated into corrosion inhibitor formulations.

Unlike traditional quaternary ammonium chlorides, the quaternary ammonium salts containing non-halogen anions described herein not only have low corrosion properties, but act as corrosion inhibitors.

The salts are easily soluble in or even miscible with water, have high oil solubility, and have a high affinity for metal surfaces. In addition, they increase the solubility of oils, such as fragrance oils and lipophilic substances, in aqueous solutions.

Other quaternary ammonium carbonates useful in the present invention include, but are not limited to, those having the formula:

(II)

wherein $R^5$ and $R^6$ are each independently a $C_{1-20}$ alkyl group or an aryl-substituted $C_{1-20}$ alkyl group (e.g., a benzyl group). $R^5$ and $R^6$ may be the same or different.

The term "aryl-substituted alkyl group" refers to an alkyl group substituted by one or more aromatic carbon rings, in particular phenyl rings, such as phenylethyl (the alkyl group being bound to the nitrogen atom) or benzyl.

The term "$C_{n-m}$ alkyl group" (for example, "$C_{1-20}$ alkyl group") refers to any linear or branched alkyl group having from n to m (for example, from 1 to 20) carbon atoms.

According to one embodiment, $R^5$ and $R^6$ are $C_{4-20}$ alkyl or aryl-substituted $C_{4-20}$ alkyl groups.

According to a preferred embodiment, $R^5$ is a $C_{8-12}$ alkyl or aryl-substituted $C_{8-12}$ alkyl group.

A more preferred quaternary ammonium carbonate is didecyldimethylammonium carbonate, such as di-n-decyldimethylammonium carbonate.

Didecyldimethylammonium carbonate is available as a 50 percent by weight solution in water containing 4 percent or less by weight of an alcohol, such as methanol or ethanol. The solution is a yellow/orange liquid that has a slightly fruity odor.

Suitable quaternary ammonium bicarbonates include, but are not limited to, those having the formula:

(III)

wherein $R^5$ and $R^6$ have the meanings and preferred meanings as defined above for the quaternary ammonium carbonates (II).

A preferred quaternary ammonium bicarbonate is didecyldimethylammonium bicarbonate, such as di-n-decyldimethylammonium bicarbonate.

The aforementioned quaternary ammonium carbonates and bicarbonates can be prepared by methods known in the art, such as those described in U.S. Pat. No. 5,438,034 and International Publication No. WO 03/006419.

The quaternary ammonium carbonates and bicarbonates are in equilibrium. The concentrations of bicarbonates and carbonates vary depending on the pH of the solution in which they are contained.

In a preferred embodiment, $R^5$ and $R^6$ in the quaternary ammonium carbonates (II) and/or bicarbonates (III) denote the same $C_{1-20}$ alkyl group.

In a more preferred embodiment, $R^5$ and $R^6$ in the quaternary ammonium carbonates (II) and/or bicarbonates (III) denote $C_{10}$ alkyl groups, most preferably n-$C_{10}$ alkyl groups.

In another preferred embodiment, $R^5$ in the quaternary ammonium carbonates (II) and/or bicarbonates (III) denotes a methyl group. More preferably, both $R^5$ and $R^6$ denote a methyl group.

In still another preferred embodiment, $R^5$ in the quaternary ammonium carbonates (II) and/or bicarbonates (III) denotes a benzyl or phenylethyl group.

The above described quaternary ammonium carbonates and bicarbonates can be used alone as corrosion inhibitors or formulated into corrosion inhibitor formulations.

Unlike traditional quaternary ammonium chlorides, the carbonate and bicarbonate based quaternary ammonium compounds described herein not only have low corrosion properties, but act as corrosion inhibitors.

The carbonates and bicarbonates are miscible in water in all concentrations, have high oil solubility, and have a high affinity for metal surfaces. In addition, the carbonates and bicarbonates increase the solubility of oils, such as fragrance oils and lipophilic substances, in aqueous solutions.

Suitable solvents for the quaternary ammonium salts containing non-halogen anions include polar solvents (such as water and water-miscible polar solvents), glycols, glycol ethers (such as propylene glycol) and mixtures thereof.

Optionally, one or more additional surfactants may be included in the composition. Suitable surfactants include non-ionic surfactants, cationic surfactants (other than the quaternary ammonium salts containing non-halogen anions described herein), anionic surfactants, amphoteric surfactants, and mixtures thereof. Non-limiting examples of such surfactants are amine oxides, linear alcohol ethoxylates, secondary alcohol ethoxylates, ethoxylate ethers, betaines, fatty acids containing from 6 to 22 carbon atoms, salts of said fatty acids, and mixtures thereof. For example, the surfactant may be nonylphenol ethoxylate.

The quaternary ammonium corrosion inhibitors inhibit corrosion of metals in aqueous and oil environments, including water and oil mixtures (e.g., in down-hole applications in oilfields and metal working). A non-limiting example of an oil found in an oil environment is a petroleum distillate. Examples of petroleum distillates include, but are not limited to, kerosene, white spirits, and hydrocarbon fractions. In metal working, aqueous solutions and water-oil mixtures or emulsions are frequently used for lubrication (such as for lubricating metal working tools).

Other conventional additives, such as builders, colorants, perfumes, fragrances, cleaners, and mixtures thereof, may be included in the anticorrosive composition.

The amount of quaternary ammonium salts containing non-halogen anions applied to a metal substrate is a corrosion inhibiting effective amount, i.e., an amount to prevent or reduce the rate of corrosion of the metal substrate. The corrosion inhibiting effective amount may vary depending upon the use intended, and can be determined by one of ordinary skill in the art.

Without wishing to be bound by any particular theory, it is believed that in aqueous solutions, the quaternary ammonium salts containing non-halogen anions described herein have a natural affinity for the metal, since they also act as cationic surfactants, and therefore migrate to the surface of the metal. Once at the surface, the quaternary ammonium salt containing non-halogen anions block oxygen and/or air from causing further oxidation of the metal surface.

Typically, the corrosion inhibiting composition can be supplied in either a dilutable concentrated form, or in a ready to use form. Generally, the ready to use form contains from about 0.005% to about 1.00% by weight of quaternary ammonium salt containing non-halogen anions (such as, for example, quaternary ammonium carbonate, bicarbonate, or a mixture thereof), based upon 100% by weight of the total composition. Preferably, the ready to use form contains from about 100 ppm to about 1000 ppm of quaternary ammonium salt containing non-halogen anions (such as, for example, quaternary ammonium carbonate, bicarbonate, or a mixture thereof), based upon the 100% by weight of total composition. Preferably, the final use dilution contains from about 100 ppm to about 500 ppm of quaternary ammonium salt containing non-halogen anions (such as, for example, quaternary ammonium carbonate, bicarbonate, or a mixture thereof), based upon 100% by weight of total use dilution.

The composition may be applied to the metal substrate by any means known in the art, including, but not limited to, coating, depositing, dipping, soaking, brushing, spraying, mopping, washing or the like.

In preferred embodiments, the metal substrate is selected from the group consisting of steel, cast iron, aluminum, metal alloys, and combinations thereof.

Coatings

The aforementioned anti-corrosive quaternary ammonium salts containing a non-halogen anion (such as, for example, the anti-corrosive quaternary ammonium carbonates, bicarbonates, and mixtures thereof), may be incorporated into anti-corrosive coatings for metal substrates. The coatings of the present invention include a coating material. Preferably, the quaternary ammonium salt containing non-halogen anions is dissolved or dispersed in the coating material.

Suitable coating materials include, but are not limited to, organic resins, such as epoxy resins, urethane resins, vinyl resins, butyral resins, phthalic acid resins, curable resins, such as isocyanate and butadiene resins, as well as traditional coatings, such as varnishes, low VOC solvent coatings based on polyurethanes, and water-based coatings such as rosin fatty acid vinylic emulsions. The coating may be formed by methods known in the art.

The coatings of the present invention may be, for example, paints, primers, and industrial coatings.

Additional ingredients that may be present in the coating include, but are not limited to, UV stabilizers, curing agents, hardening agents, flame retardants, and mixtures thereof.

According to one preferred embodiment, the anti-corrosive coating for a metal substrate comprises (a) at least one quaternary ammonium salt of the formula (I)

wherein $R^1$ is an optionally aryl-substituted $C_{1-20}$ alkyl group, and $R^2$ is an optionally aryl-substituted $C_{1-20}$ alkyl group, $R^3$ and $R^4$ independently of each other are $C_{1-4}$ alkyl groups, $X^{n-}$ is an anion selected from the group consisting of hydroxide, carbonate, bicarbonate, phosphates, phosphites, hypophosphite, nitrate, sulfates, borates, anions of saturated and unsaturated acyclic $C_{1-20}$ monocarboxylic acids, anions of saturated and unsaturated $C_{2-20}$ dicarboxylic acids, and anions of hydroxy-substituted carboxylic acids, and n denotes the appropriate number of negative charges of said anion, and (b) a coating material.

According to one embodiment, the quaternary ammonium salt(s) have the formula above with the proviso that, if both $R^3$ and $R^4$ are methyl, $X^{n-}$ is neither carbonate nor bicarbonate.

The preferred meanings of the substituents $R^1$ through $R^4$ described above apply to the anti-corrosive coating in an analogous way.

According to another preferred embodiment, the quaternary ammonium salt is one of the aforementioned anti-corrosive quaternary ammonium carbonates, bicarbonates, or a mixture thereof.

Preferably, the quaternary ammonium salt is dissolved or dispersed in the coating material.

A metal substrate having the above described anti-corrosive coating on at least one surface is also an object of the present invention.

Aqueous and Non-Aqueous Solutions (Including Cleaning Solutions and Metalworking Fluids)

The aforementioned corrosion inhibitor compositions are particularly useful as components of aqueous cleaning solutions to retard and minimize the corrosion of metal parts, particularly steel, being cleaned with these solutions. They are also useful as components of aqueous or non-aqueous metalworking fluids and as components of aqueous or non-aqueous solutions used as corrosion inhibitors in powder metallurgy. In these applications, the same preferred structures (I), (II) and (III) and the same preferred meanings of the substituents therein as specified above for the quaternary ammonium salts used in the method for inhibiting corrosion and the anti-corrosive coating apply likewise. The corrosion inhibitor compositions also afford anti-microbial protection to the substrate, such as metal, to which they are applied. For the purpose of the present invention, the term "cleaning solution" refers to an aqueous acidic or alkaline solution that is employed in the cleaning of metal surfaces, e.g., the internal metal surfaces of process equipment. These cleaning solutions typically have a pH in the range of about 1 to about 10. Exemplary cleaning solutions and their uses are disclosed in several patents, e.g., U.S. Pat. Nos. 3,413,160; 4,637,899; Re. 30,796; and Re. 30,714.

Cleaning solution compositions in accord with the present invention may include at least one organic acid selected from the group consisting of alkylene polyamine polycarboxylic acids, hydroxyacetic acid, formic acid, citric acid and mixtures or salts thereof together with a corrosion inhibitor in accord with the foregoing compositions present in an amount effective to inhibit the corrosion of metals in contact with the solution. Exemplary organic acids include N,N,N',N'-ethylenediaminetetraacetic acid (EDTA), tetraammonium EDTA, diammonium EDTA, N-(2-hydroxyethyl)-N,N',N'-ethylenediaminetriacetic acid (HEDTA) and salts thereof. These aqueous cleaning solutions typically exhibit a pH from about 1 to about 10. Exemplary amounts of corrosion inhibitor (i.e., quaternary ammonium salt containing a non-halogen anion) are from about 0.05 to about 1 percent by weight. Exemplary organic acid cleaning solutions include those described in U.S. Pat. No. 6,521,028.

The corrosion inhibitor compositions of the present invention may also be used in aqueous cleaning solutions to inhibit the corrosion of metal by hypochlorite as well as by inorganic acids, e.g., sulfuric acid or phosphoric acid. These cleaning solutions include an amount of corrosion inhibitor in accord with the present invention that is sufficient to inhibit the corrosion of metals by these inorganic acids. Exemplary amounts of corrosion inhibitor are from about 0.05 to about 1 percent by weight.

Corrosion inhibitors in accord with the present invention prevent, or at least minimize, excess corrosion of clean base metal during chemical cleaning operations. The corrosion inhibitor compositions may be employed advantageously over a wide pH range in a wide number of cleaning solutions employing an organic acid as the cleaning agent.

Cleaning solutions are frequently employed in the removal of scale and rust from ferrous metals. However, the solutions often contact other metals that are present as an integral part of the system being cleaned. Examples of those metals include copper, copper alloys, zinc, zinc alloys and the like.

The corrosion inhibitor compositions of the present invention advantageously are employed in an amount sufficient to inhibit acid-induced corrosion of metals that are in contact or contacted with aqueous cleaning solutions. According to one embodiment, the corrosion inhibitor compositions of the present invention are employed in an amount sufficient to give a corrosion rate less than or equal to about 73.2 $g \cdot m^{-2} \cdot d^{-1}$ (0.015 $lb/ft^2/day$). The corrosion inhibitor composition may be dissolved or dispersed in the cleaning solution prior to contacting the cleaning solution and the metal to be cleaned.

The following examples illustrate the invention, but are not limiting thereof. All parts and percentages are given by weight unless otherwise stated.

EXAMPLE 1

Submerged Steel Coupon Test (Reference: NB5709-151)

Di-n-decyldimethylammonium bicarbonate/carbonate (Carboquat®) was neutralized to a pH of about 7 using various acids, such as, sulfuric acid, acetic acid, glycolic acid, citric acid, adipic acid, boric acid, or phosphoric acid. During the neutralization carbon dioxide was bubbled off, thus forming the di-n-decyldimethylammonium salt of the respective acid.

A 0.1% (1000 ppm) solution of each of the salts was made. A cold rolled steel coupon was submerged into each of the solutions and allowed to stand overnight. After that, a visual examination was made as to whether the steel coupon showed signs of corrosion. Coupons submerged in either deionized water alone or submerged in a 0.1% solution of di-n-decyldimethylammonium chloride were run as controls. All of the samples showed less visible corrosion than the controls, with phosphate and glycolate samples exhibiting no corrosion at all of the steel coupon.

Humidity Chamber Testing Results (Reference: NB5751-010)

A Corrosion Inhibition Study (Reference: NB5751-001 through 018) was done with the objective to prepare steel panels (S-46, purchased from Q-Panel Lab Products, Cleveland, Ohio) with various aqueous treatments of Phosphoquat (di-n-decyldimethylammonium phosphates, prepared by adding the amount of 85% aqueous phosphoric acid required to obtain the specified pH to CarboShield™ 1000, which is a 50% aqueous solution of di-n-decyldimethylammonium (bi) carbonate (90 mol % bicarbonate, 10 mol % carbonate)), and various related controls. A plastic tank being 27.9 cm (11") in diameter and 27.9 cm (11") in height was used to treat the panels. The plastic tank was filled with 9,600 grams of test solution. 10.16 cm×15.24 cm×1.59 mm (4"×6"×1/16") steel (S-46) panels with a hole of 6.35 mm (1/4") in diameter located 6.35 mm (1/4") from the top edge were treated by placing a plastic pipette through the hole in the panel. Up to three panels were skewed using the same pipette. This allowed for the panels to stand upright, with only the bottom of the panel touching the bottom of the tank. The tank was then placed in an oven which was at 70° C. for one hour. After one hour, the panels were removed from the tank, dried with a paper towel and then wrapped in a plastic wrap and labeled. The test solutions prepared can be found in the list below.

Test Solutions
Deionized Water
0.1% Phosphoquat (pH=2.5) in Deionized Water
0.1% Phosphoquat (pH=4.0) in Deionized Water
0.1% Phosphoquat (pH=7.5) in Deionized Water After the steel panels had been treated, they were sent to Assured Testing Services (224 River Rd., Ridgway, Pa. 15853) to undergo humidity chamber testing using ASTM# B1735-02. The test was conducted at 80% relative humidity and 80.degree. C. The Phosphoquat samples visually exhibited less rust than the control samples. Importantly, it has been found that several of the samples according to the present invention, including Phosphoquats 2.5 and 7.5 were easier to apply and performed as well or better than a commercial flash rust inhibitor (IsoPrep® 225, from McDermott).

EXAMPLE 2

The object of this experiment was to test the removal of greasy soil with engine cleaner formulations. A mixture of 7.5 g vegetable oil (Crisco® oil, The J. M. Smucker Co., Orville, Ohio) and 0.1 g carbon black was heated until liquefied. 0.5 g of the heated mixture was spread onto a metal coupon (steel coupon of 0.813×25.4×76.2 $mm^3$ (0.032"×1"×3") dimensions available from Q-Panel Lab Products, Cleveland Ohio) and allowed to dry. The metal coupon was then partially submerged in 50 ml of a formulation containing morpholine or didecyldimethylammonium carbonate/bicarbonate (DDACB), as detailed in Table 1 below. After 1 hour, the metal coupon was removed from the formulation, and rinsed with water. A visual assessment was performed as to how much of the greasy soil was removed from the submerged portion of the metal coupon. The results are set forth in Table 1.

As shown in Table 1, replacement of morpholine by didecyldimethylammonium carbonate in the microemulsion results in significant improvement in both formulation stability and cleaning ability. Formulations A and B, both containing didecyldimethylammonium carbonate, resulted in removal of 100% of the greasy soil from the metal coupon, and maintained one phase, whereas formulations C and D, both of which contained morpholine and no didecyldimethylammonium carbonate, resulted in only 20% greasy soil removal and phase separated into two opaque phases.

TABLE 1

| Ingredient | Formulation A (% wt/wt) | Formulation B (% wt/wt) | Formulation C (% wt/wt) | Formulation D (% wt/wt) |
|---|---|---|---|---|
| Aromatic 200 ™ | 6.0 | 6.0 | 6.0 | 6.0 |
| Exxate ® 700 | 6.0 | 6.0 | 6.0 | 6.0 |
| Dowanol ® DpnB | 20.0 | 20.0 | 20.0 | 20.0 |
| DDACB (50%) | 12.0 | 15.0 | — | — |
| Neodol ® 91-6 | — | — | 7.5 | 7.5 |
| Morpholine | — | — | — | 7.5 |
| Deionized Water | 56.0 | 53.0 | 60.5 | 53.0 |
| TOTAL | 100.0 | 100.0 | 100.0 | 100.0 |
| Appearance | One phase Slightly hazy | One phase Clear | Two phases Opaque | Two phases Opaque |
| Greasy Soil Removal | 100% | 100% | 20% | 20% |

Aromatic 200™ is a mixture of aromatic hydrocarbons available from ExxonMobil Chemical of Houston, Tex.

Exxate® 700 is oxo-heptyl acetate available from ExxonMobil Chemical of Houston, Tex. Dowanol® DpnB is dipropylene glycol n-butyl ether available from Dow Chemical of Midland, Mich.

Neodol® 91-6 is a mixture of ethoxylated $C_{9-11}$ alcohols with an average degree of ethoxylation of six (6 moles ethylene oxide per mole of alcohol) available from Shell Chemicals of Houston, Tex.

EXAMPLE 3

Cold rolled steel coupons (mild steel coupons of 0.813× 25.4×76.2 mm³ (0.032"×1"×3") dimensions (Q-Panel Lab Products, Cleveland Ohio)) were fully submerged in either deionized water or tap water, and in either deionized water containing 100 or 1000 ppm of didecyldimethylammonium carbonate/bicarbonate (DDACB) mixture or tap water containing 100 or 1000 ppm of didecyldimethylammonium carbonate/bicarbonate mixture in 120 ml (4 oz.) glass jars with screw-on caps. Each solution was tested with two coupons (coupons 1-10 and A-J, respectively). After one week, the coupons were removed, rinsed with either deionized or tap water and brushed lightly with a soft nylon brush. The coupons were then dried under a stream of nitrogen and weighed. The results are set forth in Table 2 below. Differences in weight are expressed as (−) for weight loss, or (+) for weight gain. All weight differences are given in percent, based on the original weight of the respective coupon.

TABLE 2

| Sample | Coupon | pH | Wt. [g] (before) | Wt. [g] (after) | % Wt. change |
|---|---|---|---|---|---|
| DI water | 1 | 8.6 | 12.6248 | 12.6193 | −0.044 |
|  | A |  | 12.6521 | 12.6463 | −0.046 |
| DI water + 100 ppm | 2 | 9.1 | 12.6161 | 12.6112 | −0.039 |
| DDACB | B |  | 12.5611 | 12.5555 | −0.045 |
| DI water + 1000 ppm | 3 | 8.3 | 12.5870 | 12.5873 | +0.002 |
| DDACB | C |  | 12.5824 | 12.5824 | ±0.000 |
| DI water + 100 ppm | 4 | 9.1 | 12.7384 | 12.7385 | +0.001 |
| DDACB | D |  | 12.6235 | 12.6185 | −0.040 |
| DI water + 1000 ppm | 5 | 8.9 | 12.7594 | 12.7596 | +0.002 |
| DDACB | E |  | 12.6350 | 12.6351 | +0.001 |
| Tap water | 6 | 7.1 | 12.6807 | 12.6735 | −0.057 |
|  | F |  | 12.5739 | 12.5667 | −0.057 |
| Tap water + 100 ppm | 7 | 7.2 | 12.7034 | 12.6969 | −0.051 |
| DDACB | G |  | 12.5835 | 12.5770 | −0.052 |
| Tap water + 1000 ppm | 8 | 7.5 | 12.6561 | 12.6564 | +0.002 |
| DDACB | H |  | 12.5933 | 12.5935 | +0.002 |
| Tap water + 100 ppm | 9 | 7.3 | 12.6553 | 12.6476 | −0.061 |
| DDACB | I |  | 12.6930 | 12.6868 | −0.049 |
| Tap water + 1000 ppm | 10 | 7.4 | 12.6675 | 12.6674 | −0.001 |
| DDACB | J |  | 12.5273 | 12.5284 | +0.009 |

As shown in Table 2, solutions containing 1000 ppm of didecyldimethylammonium carbonate/bicarbonate did not degrade after 1 week, as evidenced by essentially no loss in weight of the metal coupon. No sediment formation was observed for these samples. The other test solutions became brown and showed sediment on the bottom of the glass jar. Corrosion was observed on the cold rolled steel coupon exposed to deionized water after one hour, while no corrosion was observed on the coupon exposed to deionized water containing 1000 ppm of the didecyldimethylammonium carbonate/bicarbonate after one week.

EXAMPLE 4

Deionized water (58.2% w/w), surfactant (octyldimethylamine oxide (40% active), FMB-A08®, Lonza, Inc., Fair Lawn, N.J.) (8.0% w/w) and a 50% aqueous solution of a quaternary compound (didecyldimethylammonium chloride (DDAC), or didecyldimethylammonium carbonate/bicarbonate mixture (DDACB)) (33.8% w/w) were mixed together.

A 1:256 dilution of the mixture (660 ppm active quaternary ammonium compound) in water was used to assess the corrosion inhibition properties of DDAC and DDACB. Cold rolled steel plates (steel coupons of 0.813×25.4×76.2 mm³ (0.032"×1"×3") dimensions (Q-Panel Lab Products, Cleveland Ohio)) were immersed in each of the aqueous solutions and monitored, at room temperature, for a period of nine months.

Figure 1:
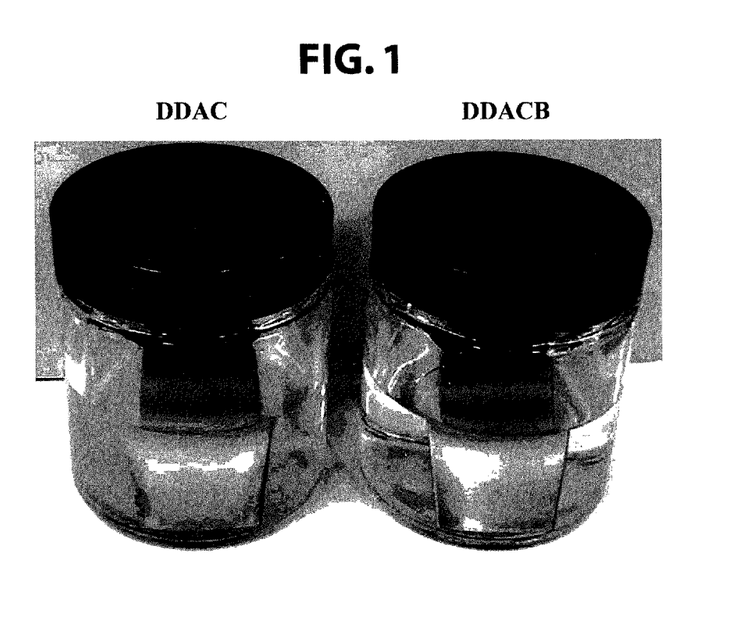
FIG. 1 is a picture of cold rolled plates of steel, each in a didecyldimethylammonium chloride (DDAC) solution or a didecyldimethylammonium carbonate/bicarbonate (DDACB) solution after 90 minutes at room temperature.
Figure 2:
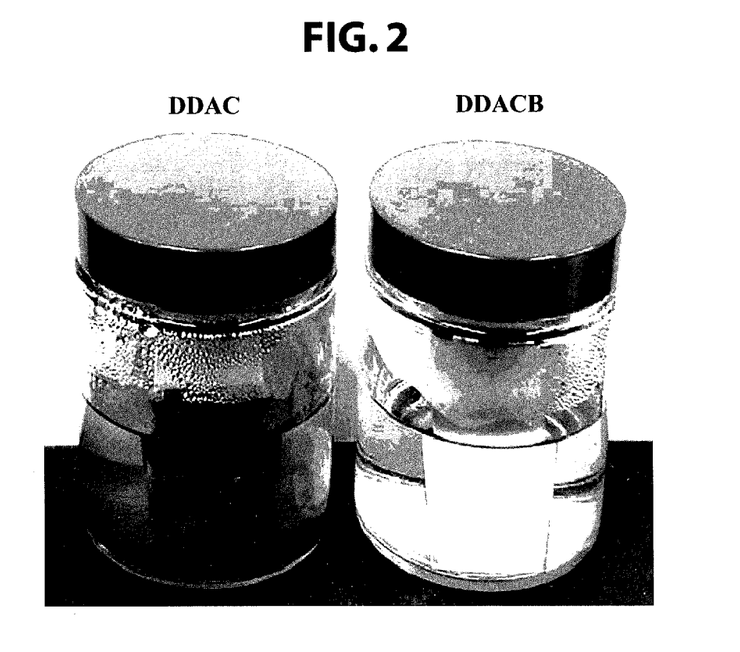
FIG. 2 is a picture of cold rolled plates of steel, each in a didecyldimethylammonium chloride (DDAC) solution or a didecyldimethylammonium carbonate/bicarbonate (DDACB) solution after 30 days at room temperature.

FIGS. 1 and 2 are pictures of the plates after standing at room temperature in the aqueous solutions for 90 minutes and 30 days, respectively. As can be seen, the plate in the DDAC solution has started to corrode, after only 90 minutes, and is badly corroded after 30 days. In contrast, the plate in DDACB shows no corrosion whatsoever, even after 30 days.

Figure 3:
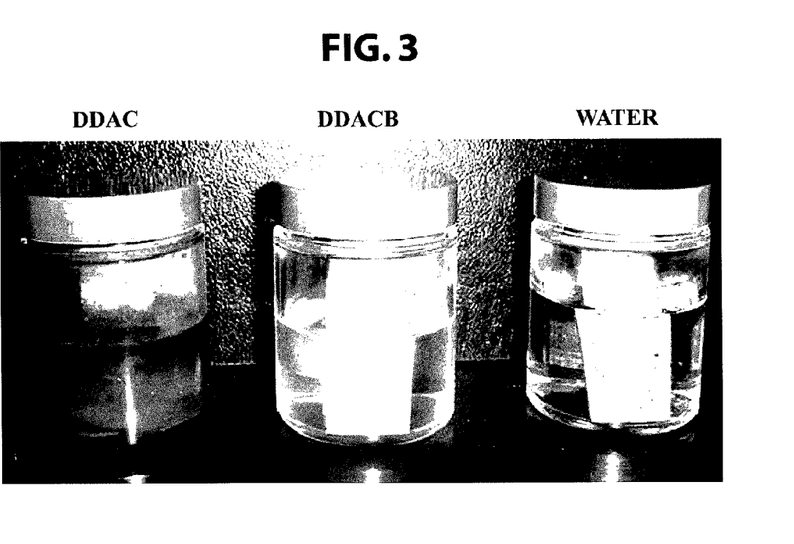
FIG. 3 is a picture of cold rolled plates of steel, each in a didecyldimethylarunonium chloride (DDAC) solution or a didecyldimethylammonium carbonate/bicarbonate (DDACB) solution after 9 months at room temperature. A sample of cold rolled steel in deionized water after 5 hours is also shown.
Figure 4:
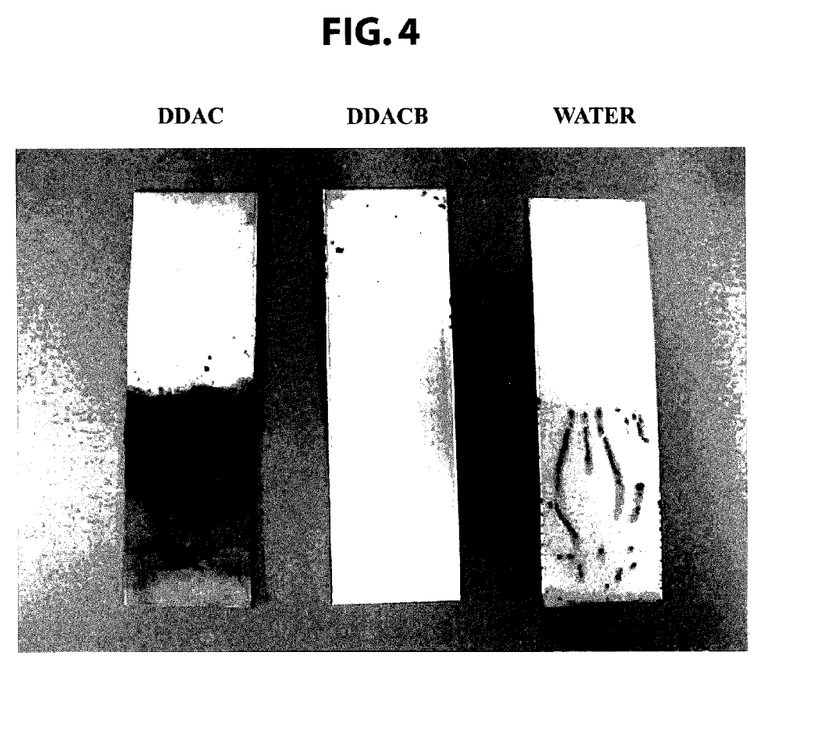
FIG. 4 is a picture of cold rolled plates of steel after soaking for 9 months at room temperature in a didecyldimethylammonium chloride solution or a didecyldimethylammonium carbonate/bicarbonate solution, and after soaking in deionized water for 5 hours at room temperature.

FIGS. 3 and 4 are pictures of the plates after standing at room temperature in the aqueous solutions for a total of 9 months. As can be seen, the plate in the DDACB solution shows no corrosion, whilst the plate in the DDAC solution is fully corroded. For comparison purposes, a piece of identical cold rolled steel, soaked in deionized (DI) water containing no quaternary ammonium compound is also shown. Even after only 5 hours in DI water, the plate shows some signs of corrosion.

All patents and publications cited herein are incorporated by reference in their entirety to the same extent as if each was individually incorporated by reference.

We claim:

1. A method for applying an anti-corrosive coating composition to a metal substrate, comprising the steps of:
   (i) providing an anti-corrosive coating composition comprising:
      (a) at least one quaternary ammonium salt containing a non-halogen anion, and
      (b) a coating material comprising a curable resin,
      wherein the at least one quaternary ammonium salt containing a non-halogen anion is didecyldimethylammonium carbonate, didecyldimethylammonium bicarbonate or mixtures thereof,
   (ii) contacting said metal substrate with said anti-corrosive coating composition to form a substantially permanent coating.

2. The method of claim 1, wherein the quaternary ammonium salt is dispersed in the coating material.

3. A metal substrate having been treated according to the method of claim 1 on at least one surface thereof.

4. The method of claim 1, wherein the coating material comprises an organic resin.

5. The method of claim 4, wherein the organic resin is selected from the group consisting of epoxy resins, urethane resins, vinyl resins, butyral resins, phthalic acid resins, isocyanate resins and butadiene resins.

6. The method of claim 1, wherein the coating material is a varnish, a low volatile organic compound solvent coating based on polyurethane or a water-based coating.

7. The method of claim 6, wherein the water-based coating is a rosin fatty acid vinylic emulsion.

8. The method of claim 1 further comprising a curing agent or a hardening agent.

9. The method of claim 1 further comprising a UV stabilizer or a flame retardant.

10. A method of inhibiting corrosion of metal surfaces comprising:
    (i) providing an anti-corrosive composition comprising:
       (a) at least one quaternary ammonium salt containing a non-halogen anion, and
       (b) a coating material comprising a curable resin,
       wherein the at least one quaternary ammonium salt containing a non-halogen anion is didecyldimethylammonium carbonate, didecyldimethylammonium bicarbonate or mixtures thereof, and
    (ii) applying the anti-corrosive composition to a metal surface.

11. The method of claim 10 further comprising mixing a corrosion inhibiting effective amount of the anti-corrosive composition with an aqueous solution prior to applying the anti-corrosive composition to a metal surface.

12. The method of claim 10 further comprising mixing a corrosion inhibiting effective amount of the anti-corrosive composition with an non-aqueous solution prior to applying the anti-corrosive composition to a metal surface.

13. The method of claim 10 further comprising mixing a corrosion inhibiting effective amount of the anti-corrosive composition with a metal working fluid prior to applying the anti-corrosive composition to a metal surface.

14. The method of claim 10 further comprising mixing a corrosion inhibiting effective amount of the anti-corrosive composition with a UV stabilizer or a flame retardant prior to applying the anti-corrosive composition to a metal surface.

15. The method of claim 10 further comprising mixing a corrosion inhibiting effective amount of the anti-corrosive composition with a paint or primer prior to applying the anti-corrosive composition to a metal surface.

16. A metal substrate having been treated according to the method of claim 10 on at least one surface thereof.

17. A method of inhibiting corrosion of metal products formed by a powder metallurgy process, the method comprising:
    (i) providing an anti-corrosive composition comprising:
       (a) at least one quaternary ammonium salt containing a non-halogen anion, and
       (b) a coating material comprising a curable resin,
       wherein the at least one quaternary ammonium salt containing a non-halogen anion is didecyldimethylammonium carbonate, didecyldimethylammonium bicarbonate or mixtures thereof, and
    (ii) mixing the anti-corrosive composition with fine particles of metal used in a powder metallurgy process.

* * * * *